March 4, 1958 R. G. O'FALLON 2,825,846

COLOR TELEVISION RECEIVER

Filed May 3, 1955

INVENTOR.
Richard G. O'Fallon
BY
Mueller & Aichele
Attys 2,825,846
Patented Mar. 4, 1958

2,825,846

COLOR TELEVISION RECEIVER

Richard G. O'Fallon, Westchester, Ill., assignor to Motorola, Inc., Chicago, Ill., a corporation of Illinois Application May 3, 1955, Serial No. 505,619

6 Claims. (Cl. 315—13)

This invention relates to television receivers and, more specifically, to beam deflection apparatus having particular use in color television receivers utilizing tri-beam cathode ray tubes.

In a common type of color television receiver, an image reproducing tube is utilized in which three electron beams are scanned across a screen composed of a multiplicity of triad groups of phosphor dots. Each of the electron beams is modulated with different components of the received signal to represent a primary color, and the tube is constructed so that each beam may impinge upon a particular dot in the triad which produces the corresponding primary color. The triad group then appears to the eye as an element of a picture having a color determined by the combination of colors produced by the separate phosphor dots. The beams, synchronized by the received color television signal, scan the triad groups to form a complete picture in full color. It is usual to provide an apertured shadow mask adjacent the screen of the image tube screen and between it and the guns, and to converge the three electron beams in the plane of the mask. This enables the beams to pass through the apertures in the mask and impinge upon the proper phosphor dots of each triad and prevents the beams from striking the dots as they are deflected from one triad group to another.

A suitable deflection yoke section is provided on the neck of the image tube for deflecting the beams in the line or horizontal direction. This yoke section generally consists of two inductive windings mounted on either side of the path of the beams. A further yoke section is provided for the field or vertical deflection, and also having two inductive windings disposed on opposite sides of the tube neck. Sawtooth signals synchronized with a received color television signal are impressed on the yoke for creating magnetic fields for deflecting the beams, this being achieved in a manner well understood by the art.

Remembering that there are three spaced electron beams passing through the fields of the image tube yoke in a color television receiver, it should be apparent that if, in a particular image tube and yoke combination, the yoke does not produce symmetrical fields across the tube neck, the different beams will be deflected by somewhat different fields at a given instant so that deflection of each beam will not be the same. In other words, the tube and yoke may be an unbalanced combination so that the deflecting field does not have the necessary uniformity for effecting similar deflection of each beam at the same time.

Accordingly, it is an object of this invention to provide deflection apparatus for a television receiver which produces a substantially uniform and symmetrical deflection field for scanning an electron beam in a cathode ray tube.

Another object of the invention is to provide a deflection yoke for a tri-beam cathode ray tube in a color television receiver, which deflection yoke includes an adjustable means for regulating the beam deflecting fields to compensate for possible unbalanced tube and yoke combinations.

Another object of the invention is to provide adjustable beam deflection apparatus for a tri-beam cathode ray tube which minimizes convergence distortion caused by beam scanning within a cathode ray tube in which the deflection center of the yoke does not appear at a proper position under operating conditions.

A feature of the invention is the provision of improved beam deflection apparatus for a television receiver which apparatus includes inductive windings disposed on opposite sides of a beam path for developing a deflection field therebetween, and which includes an adjustable impedance element associated with at least one of the portions to permit variation of the field intensity in one portion with respect to the other portion, so as to provide a simple compensating means for asymmetries in the deflection field.

A further feature of the invention is the provision of a pair of adjustable impedance elements individually associated with two inductive windings of a deflection yoke, and having interconnected controls of the adjustable elements so that adjustment produces opposite effects in the windings to permit a pronounced change of the deflection center of the field producing apparatus with either section furnishing a stronger field, so as to correct the asymmetries referred to above.

Further objects, features and the attending advantages thereof will be apparent upon consideration of the following description when taken in conjunction with the accompanying drawing in which.

The beam deflection apparatus of the present invention includes inductive windings disposed on opposite sides of a cathode ray tube neck, which windings are interconnected to a source of synchronized deflection currents. The inductive windings produce the deflection field therebetween. So that the field may be adjusted to desired symmetry in a given combination of windings and image tube, a separate adjustable impedance element is coupled to at least one of the windings in order that the field of that winding may be regulated with respect to the field of the other winding through variation in the deflection current passing therethrough. It is also possible to employ a variable impedance element connected to each winding and to simultaneously adjust the variable elements in order that adjustment of the single control produces opposite effects in varying the currents in the pair of windings and giving a more pronounced effect over a greater range. By employing such deflection apparatus, unbalanced conditions in the coil windings or certain nonuniformities in the yoke or cathode ray tube construction tending to produce asymmetries in the deflection fields can be balanced out in a simple manner. Therefore, convergence distortion caused by deflection apparatus in a multi-beam cathode ray tube can be minimized.

Figure 1:
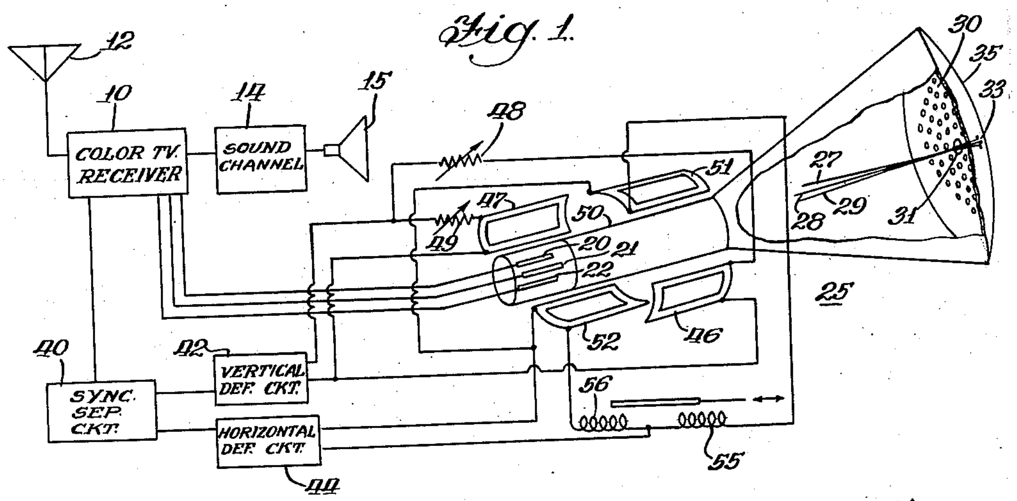
Fig. 1 is a diagrammatic representation of a television receiver incorporating the invention.

Referring now to Fig. 1, there is shown a color television receiver 10 coupled to antenna 12 which supplies signals to the receiver where they are selected, amplified and detected. A portion of the signal containing sound information is then applied to the sound channel 14 which develops an audio frequency signal suitable for operating the loud speaker 15. The receiver 10 is additionally coupled to the electron guns 20, 21 and 22 of the cathode ray tube 25. The guns 20–22 are symmetrically spaced about the center of tube 25 in known manner, and they develop three distinct electron beams which follow paths such as 27, 28 and 29 toward the apertured shadow mask 30 positioned adjacent the screen of the image tube. By suitable converging apparatus, not shown, the beams are converged in the apertures of the mask such as aperture 31, so that they may all pass therethrough to impinge upon respective ones of the phosphor dots in a triad 33. As previously mentioned, the screen is made up of a multiplicity of such triads and each triad becomes an element in a completed image formed upon the tube screen 35 and assumes a color corresponding to the aggregate of the illuminated colors of the separate phosphor dots composing the triad.

Receiver 10 is also connected to a synchronizing signal separator 40 which selects the line and field syncs to synchronize the sawtooth signals produced by the vertical deflection circuit 42 and the horizontal deflection circuit 44. Circuits 42 and 44 produce suitable deflection signals which are applied to the deflection yoke, to be described presently, to produce sawtooth currents therein in order to cause horizontal and vertical deflection of the electron beams and produce a completed image on screen 35.

The vertical deflection section of the yoke comprises windings 46, 47 which are connected respectively to variable resistors 48 and 49, and these winding-resistor series combinations are connected in parallel across the output of vertical deflection circuit 42. Horizontal deflection windings 51 and 52 are respectively connected into variable inductors 55 and 56, which winding-inductor series combinations are parallel connected across the output of horizontal deflection circuit 44. Windings 46, 47 and 51, 52 are shown spaced from the tube neck 50 for purposes of clarity and these windings constitute what is generally termed a deflection yoke. When a suitable sawtooth flows through windings 46, 47 a horizontal deflection field is produced across the neck 50 of tube 25 which effects deflection of the beams at right angles thereto or in a vertical direction. Similarly, when a suitable sawtooth current flows through windings 51, 52 a vertical field is produced in the tube neck which causes horizontal deflection of the beams.

Figure 2:
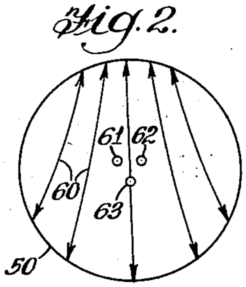
Figs. 2–5 represent deflection conditions within the tri-beam cathode ray tube.

Referring now to Fig. 2, there is shown a cross-sectional view of the tube neck 50 and representative magnetic lines of force 60. Beams, as they enter this field, are represented by beams 61, 63 and 62. As the lines of force 60 are shown, there is an asymmetry in that there is a stronger field or one of greater intensity in the upper portion of tube neck 50 than in the lower portion thereof. Such a situation might exist if a somewhat heavier current were flowing in winding 51 as compared with winding 52, or if there were some slight constructional differences between coils 51 and 52, or if there were some slight irregularity in the construction of tube 25.

Figure 3:
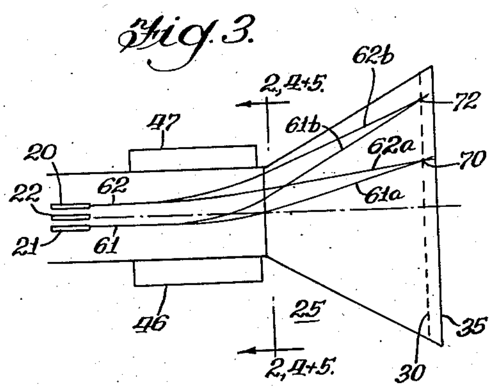

Assuming now that the lines of force 60 shown in Fig. 2 produce deflection of the beams 61–63 to the right, it may be seen that beam 62, moving perpendicular to these lines, will be deflected to the right and somewhat upwardly; that beam 61 will be deflected to the right but in a downward direction, and that beam 63 will be deflected to the right with a further deflection that will be described. Fig. 3 shows a top view of the tube 25 and two deflected positions of the beams 61, 62. At deflected position 70, the beams 61, 62 travel along respective paths **61*a* and 62*a*. It may be seen that beam 62 remains in a field causing deflection to the right and upwardly in Fig. 2, whereas beam 61 remains in a field causing deflection to the right and downwardly. Considering further deflection of the beams along paths 61*b* and 62*b* to a deflected position 72, it is apparent that beam 62 is again being forced to the right and upwardly as viewed in Fig. 2, but that beam 61 travels partially through a field to the left of the center in Fig. 2 and partially through the field to the right of the center in Fig. 2. Therefore, beam 61 will be moved downwardly for a portion of its travel within the yoke and upwardly for another portion of its travel within the yoke. It should be apparent that deflection of the beams to either position 70 or position 72 would not bring the beams into convergence with the field as shown in Fig. 2, since there would be an upward deflection of beam 62 at all times greater than any vertical upward deflection of beam 61. It may also be seen that upon deflection to the left, beam 61 will be deflected upward somewhat and beam 62** will be deflected downward. Accordingly, there will be misconvergence of the beams along each side of the screen.

Figure 4:
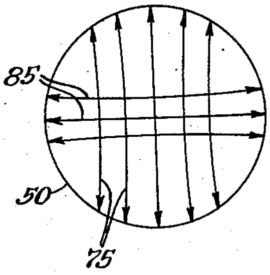

The field represented in Fig. 4 by lines of force 75 may be seen to be of uniform intensity and to be one which would not cause the above described misconvergence. While it may be desirable that the field have a somewhat pincushioned shape for correcting other types of distortion, it will be appreciated that this is a symmetrical field with the apparent center of deflection at the center of tube neck 50. With this field configuration, it is evident that misconvergence to the degree dictated by the field of Fig. 2 would not be obtained with the field of Fig. 4.

In accordance with this invention, the variable inductors 55 and 56 are adjusted to correct the field of Fig. 2 and produce a field such as shown in Fig. 4. In the situation shown, this would be accomplished by reducing the current through winding 51 and/or increasing the current through winding 52. As previously pointed out, however, the asymmetrical field may or may not have been caused by dissimilar currents in the winding but the correction to produce the desired field is effected by changing the currents in the coils. It should also be apparent that the field might be less dense at the top and more dense at the bottom, in which case corresponding misconvergence of the beams would be produced and that this misconvergence could be corrected by opposite adjustment of the variable inductors 55, 56. It may also be seen that beam 63 will be subjected to a similar, but lesser, misconverging effect but that the correction, as decsribed in conection with beams 61, 62, would also tend to correct the misconvergence of beam 63.

The desired adjustment of variable inductors 55, 56 may best be provided by means of ganging the adjustable provisions of the coils in such a manner that increasing the inductance of one winding decreases the inductance of the other winding. This, for example, can be accomplished by a movable slug 76 which enters one of the inductances as it leaves the other. This simplifies adjustment of the device and provides an adjustment in which either deflection winding 51 or 52 is carrying the greater current, or in which both currents are the same, so that any desired correction effect can be obtained.

Figure 5:
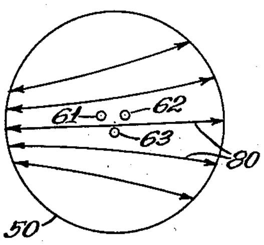

Fig. 5 shows an unbalanced condition across the tube neck 50 as produced by a stronger field from the vertical deflection winding 47 and a comparatively weak field from the vertical deflection coil 46. Again, considering that the motion of the electron beams 61–63 would be perpendicular to the force line 80, it may be appreciated that beam 61 would be deflected vertically by a more intense field at any given instant than would beam 62. Therefore, the major defect produced by the field configuration shown in Fig. 5 would be that beam 61 traces across the screen 35 during horizontal scanning in a position somewhat above that of beam 62. Correction of this field may be obtained by adjustment of variable resistors 48, 49 in order to decrease the current through winding 48 and/or to increase the current through deflection winding 47. The same advantage, as described in connection with variable inductors 55, 56, may be obtained by ganging the variable provision of resistors 48, 49 so that increase of current through one deflection winding is accompanied by a decrease in current through the other deflection winding. Therefore, it is apparent that by suitable adjustment of the resistors 48, 49, a uniform field may be produced across the tube neck 50 as represented by magnetic lines of force 85 in Fig. 4.

The invention has been described in connection with parallel-connected yoke coils which are familiar to those in the art as advantageous in minimizing "ringing" or oscillation in the deflection yoke. It is known that series connected yoke coils have inferior ringing characteristics but that, of course, the current through such yoke coils would be equal, thus reducing the possibility of asymmetrical deflection fields as shown in Figs. 2 and 5. However, it should be pointed out that due to various irregularities or manufacturing tolerances in the construction of the yoke and in the construction of the cathode ray tube, asymmetrical fields may be produced in the series connected deflection system.

Figure 6:
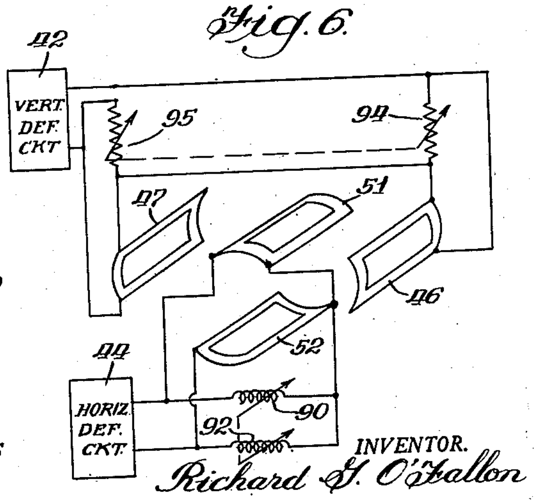
Fig. 6 is a diagram of an additional embodiment of the invention.

Fig. 6 illustrates the vertical deflection windings 46, 47 series connected to the vertical circuit 42 and the horizontal deflecting windings 51, 52 series connected across the output of horizontal circuit 44. In accordance with the invention, there is also shown a variable inductor 90 coupled across winding 51 and variable inductor 92 coupled across deflection winding 52. The variable provisions of these windings may be ganged as previously described in connection with the other embodiment. There is also shown resistors 94, 95 respectively coupled across deflection windings 46, 47 with their adjustable arms ganged. Therefore, it is apparent that any unmatched tube and yoke combinations which might produce asymmetrical deflection fields as shown in Figs 2 and 5 may be corrected by separate adjustment of the current through each individual deflection winding.

It may be seen that this invention provides, therefore, adjustable beam deflection apparatus for a tri-beam cathode ray tube the deflection fields produced by which may be adjusted to a desired uniform symmetry across the tube neck. The apparatus is comparatively simple and provides convenient adjustment to minimize convergence distortion caused by irregularities in the construction of the cathode ray tube or in the construction of the yoke deflection windings or caused by other imperfections which may be balanced by altering the deflection current in the windings of the yoke.

I claim:

1. In a television receiver having means for translating a received signal, an electron image reproducing tube adapted to direct a plurality of electron beams modulated by the received signal through a neck of the tube and at an associated fluorescent screen, and means for producing a scanning signal suitable for deflecting the beam across the screen, the yoke apparatus for such a reproducing tube including in combination, dual section field producing means, means for applying the scanning signal to said field producing means, the sections of said field producing means being adapted to be disposed on opposite sides of the tube neck and having preselected electrical characteristics to produce a deflecting field across the neck, and variable means coupled to said field producing means to alter the scanning signal applied to one section with respect to the signal applied to the other section, whereby variation of said variable means changes the relation of the field produced by one section of said field producing means with respect to the field produced by the other section.

2. In a television receiver having means for translating a received signal, an electron image reproducing tube adapted to direct a plurality of electron beams modulated by the received signal through a tube neck of the tube and at an associated fluorescent screen, and means for producing control signals suitable for deflecting the beam across the screen in two directions, the yoke apparatus for such a reproducing tube including in combination, a pair of dual section field producing coils, circuit means for applying the control signals to said pair of coils, the sections of each of said field producing coils being adapted to be disposed in spaced relation about the tube neck and having preselected electrical characteristics to produce respective deflecting field portions across the neck, a variable inductor means coupled to each section of one of said pair of coils and to said circuit means to alter the control signal applied to one section with respect to the signal applied to the other section, and variable resistor means coupled to each section of the other of said pair of coils and to said circuit means to alter the control signal applied to one section of such pair of coils with respect to the signal applied to the other section thereof, whereby variation of said inductor and resistor means changes the field produced by the associated section of the coil with respect to the field produced by the other section of the coil.

3. In a television receiver having means for translating a received signal, an electron image reproducing tube adapted to direct a plurality of electron beams modulated by the received signal through a tube neck of the tube and at an associated fluorescent screen, and means for producing line and field control signals suitable for deflecting the beam across the screen in two directions, the yoke apparatus for such a reproducing tube including in combination, line and field dual section deflection coils, circuit means for applying the respective control signals to said line and field coils, the sections of each of said coils being adapted to be disposed in spaced relation about the tube neck and having preselected electrical characteristics to produce respective deflecting field portions across the neck, said circuit means including variable inductor means coupled to at least one section of said line deflection coils for apportioning line signals applied thereto with respect to such signals applied to the other section thereof, and said circuit means further including variable resistor means coupled to at least one section of said field coils for apportioning field signals applied thereto with respect to such signals applied to the other section thereof, whereby variation of said variable inductor and resistor means changes the relation of the field produced by one dual section of the coils with respect to the field produced by the other dual section.

4. A beam deflection yoke for a tri-beam cathode ray tube including in combination, a first pair of windings for producing a deflection field for line scanning of the beams, first circuit means providing line deflection signals, first variable impedance means having two portions, means coupling said first pair of windings in parallel across said first circuit means through different portions of said first variable impedance means, a second pair of windings for producing a deflection field for field scanning of the beams, second circuit means providing field deflection signals, second variable impedance means having two portions, means coupling said second pair of windings in parallel across said second circuit means through different portions of said second variable impedance means, whereby adjustment of said first and second variable impedance means provides balancing of the field produced by said first and second pairs of windings for modifying the deflection of the beams in the tri-beam cathode ray tube.

5. A beam deflection yoke for a tri-beam cathode ray tube including in combination, a first pair of windings for producing a deflection field for scanning of the beams in one direction, first circuit means providing deflection signals, means coupling said first pair of windings to said first circuit means, a second pair of windings for producing a deflection field for scanning of the beams in another direction, second circuit means providing deflection signals, variable impedance means having two portions, means coupling said second pair of windings in parallel across said second circuit means, with each winding being connected in series with one portion of said variable impedance means, whereby adjustment of said variable impedance means provides balancing of the field produced by said second pair of windings for modifying the deflection of the beams in the tri-beam cathode ray tube.

6. A beam deflection yoke for a tri-beam cathode ray tube including in combination, a first pair of windings for producing a deflection field for line scanning of the beams, a second pair of windings for producing a deflection field for field scanning of the beams, variable inductance means having two portions, means coupling said first pair of windings and said portions of said variable inductance means in a series loop, means for applying line deflection signals intermediate said two portions of said variable inductor means and to the common junction of said first pair of windings, variable resistor means having two portions, means coupling said second pair of windings and said portions of said variable resistor means in a series loop, and means for applying field deflection signals intermediate said portions of said variable resistor means and to the common junction of said second pair of windings, whereby adjustment of said variable inductor means and said variable resistor means provides balancing of the fields produced by said first pair of windings and said second pair of windings.

References Cited in the file of this patent

UNITED STATES PATENTS

| | | |
|---|---|---|
| 2,555,829 | Barco | June 5, 1951 |
| 2,555,831 | Tourshou | June 5, 1951 |
| 2,555,832 | Denton | June 5, 1951 |
| 2,606,306 | Bridges | Aug. 5, 1952 |
| 2,627,052 | Helpert et al. | Jan. 27, 1953 |
| 2,654,854 | Seright | Oct. 6, 1953 |
| 2,719,249 | Friend | Sept. 27, 1955 |